US012613454B2

(12) United States Patent
Osaka et al.

(10) Patent No.: US 12,613,454 B2
(45) Date of Patent: Apr. 28, 2026

(54) OPTICAL ELEMENT DRIVING DEVICE, CAMERA MODULE, AND CAMERA-MOUNTED DEVICE

(71) Applicants: Tomohiko Osaka, Tokyo (JP); Yohei Enta, Tokyo (JP)

(72) Inventors: Tomohiko Osaka, Tokyo (JP); Yohei Enta, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 148 days.

(21) Appl. No.: 18/685,526

(22) PCT Filed: Aug. 19, 2022

(86) PCT No.: PCT/JP2022/031304
§ 371 (c)(1),
(2) Date: Feb. 22, 2024

(87) PCT Pub. No.: WO2023/026964
PCT Pub. Date: Mar. 2, 2023

(65) Prior Publication Data
US 2024/0393664 A1     Nov. 28, 2024

(30) Foreign Application Priority Data
Aug. 26, 2021    (JP) ................................. 2021-138402

(51) Int. Cl.
*G03B 17/12*      (2021.01)
*G03B 3/10*      (2021.01)

(52) U.S. Cl.
CPC .............. *G03B 17/12* (2013.01); *G03B 3/10* (2013.01)

(58) Field of Classification Search
None
See application file for complete search history.

(56) References Cited

U.S. PATENT DOCUMENTS

| | | | | | |
|---|---|---|---|---|---|
| 11,982,934 | B2 * | 5/2024 | Kim | ......................... | G03B 5/06 |
| 12,197,107 | B2 * | 1/2025 | Osaka | ....................... | G03B 3/10 |
| 2009/0128931 | A1 | 5/2009 | Matsumoto | | |
| 2017/0108660 | A1 | 4/2017 | Kuo et al. | | |

FOREIGN PATENT DOCUMENTS

| | | | | |
|---|---|---|---|---|
| JP | | 10-260465 | | 9/1998 |
| JP | | 2006-098507 | | 4/2006 |
| JP | | 2006227062 | A * | 8/2006 |
| JP | | 2006-292959 | | 10/2006 |
| JP | | 2009-216934 | | 9/2009 |

(Continued)

*Primary Examiner* — Rodney E Fuller

(57) ABSTRACT

This optical element driving device (1) for driving an optical element comprises: a retaining part (10) having an opening that surrounds the outer periphery of an optical element and is capable of retaining the optical element; an accommodating part (20) for accommodating the retaining part in the inside thereof; and support parts (40A) having a plurality of contact parts (31) that come in contact with the retaining part in at least three positions distributed in the circumferential direction inside the accommodating part, the support parts (40A) supporting the retaining part so as to be able to move in an optical axis direction while the retaining part is pressed toward the inside of the opening by the plurality of contact parts.

9 Claims, 7 Drawing Sheets

(56)　　　　　　References Cited

FOREIGN PATENT DOCUMENTS

| | | | | |
|---|---|---|---|---|
| JP | 2009216934 A | * | 9/2009 | |
| JP | 2011-017769 | | 1/2011 | |
| JP | 2013-068828 | | 4/2013 | |
| JP | 2017-076020 | | 4/2017 | |
| JP | 2021-124656 | | 8/2021 | |
| KR | 20100103297 A | * | 9/2010 | .......... H04M 1/0264 |
| KR | 20200007252 A | * | 1/2020 | ............. G03B 17/12 |

* cited by examiner

M

M

OPTICAL ELEMENT DRIVING DEVICE, CAMERA MODULE, AND CAMERA-MOUNTED DEVICE

TECHNICAL FIELD

The present invention relates to an optical element driving device for driving an optical element, a camera module and a camera-mounted device.

BACKGROUND ART

In general, a camera module is mounted in a camera-mounted device such as a smartphone. Such a camera module uses an optical element driving device for driving the optical element.

The optical element driving device includes an auto focus function (hereinafter referred to as "AF function"; AF: Auto Focus). With the AF function, the optical element driving device drives the lens to automatically perform the focusing when capturing the subject.

For example, PTL 1 discloses a lens driving device including a lens holder configured to hold the lens, a ball member configured to support the lens holder in a movable manner in the optical axis direction of the lens, and an actuator configured to provide a driving force to the lens holder. In PTL 1, the lens holder is housed inside a base with a substantially rectangular shape in plan view, and the ball member is disposed at two locations, i.e., the adjacent corner portions of the base, to movably support the lens holder.

CITATION LIST

Patent Literature

PTL 1
  Japanese Patent Application Laid-Open No. 2013-068828

SUMMARY OF INVENTION

Technical Problem

In recent years, the size and weight of the lens and sensor of camera modules have tended to increase as the number of pixels in camera modules increases. PTL 1 discloses a structure in which ball members are disposed at adjacent two corner portions of the base such that the ball members support the lens holder on substantially one end side of the lens holder. With such a support structure, if the size and/or weight of the lens increases, the lens may be inclined (tilted), and it is difficult to stably support the lens in a movable manner.

An object of the present invention is to provide an optical element driving device, a camera module and a camera-mounted device that stably support the optical element in a movable manner.

Solution to Problem

An optical element driving device according to the present invention is configured to drive an optical element, the optical element driving device including: a holding part including an opening surrounding an outer periphery of the optical element and configured to hold the optical element; a housing part configured to house the holding part inside; and a supporting part including a plurality of contact parts configured to make contact with the holding part at positions separately provided at least at three locations in a circumferential direction inside the housing part, the supporting part being configured to support the holding part in a movable manner in an optical axis direction of the optical element while pressing the holding part in a direction toward inside of the opening with the plurality of contact parts.

A camera module according to the present invention includes: the above-described optical element driving device; a driving part configured to drive the holding part in a movable manner in the optical axis direction; and an image capturing part configured to capture a subject image formed by the optical element.

A camera-mounted device according to the present invention includes: a camera-mounted device serving as an information device or a transport device; the above-described camera module; and an image processing part configured to process image information obtained by the camera module.

Advantageous Effects of Invention

According to the present invention, it is possible to stably support the optical element in a movable manner.

DESCRIPTION OF EMBODIMENTS

Figure 1A:
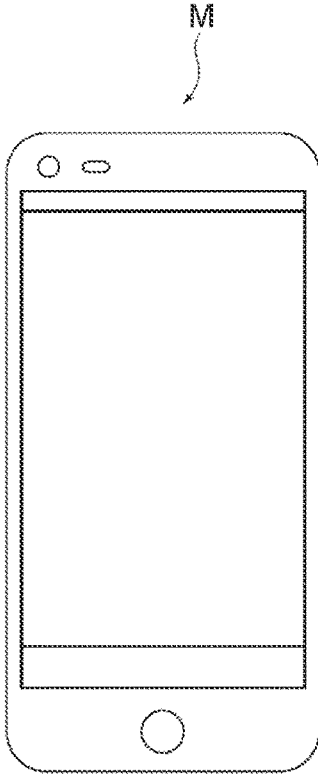
FIG. 1A is a front view illustrating a smartphone equipped with a camera module according to an embodiment of the present invention.
Figure 1B:
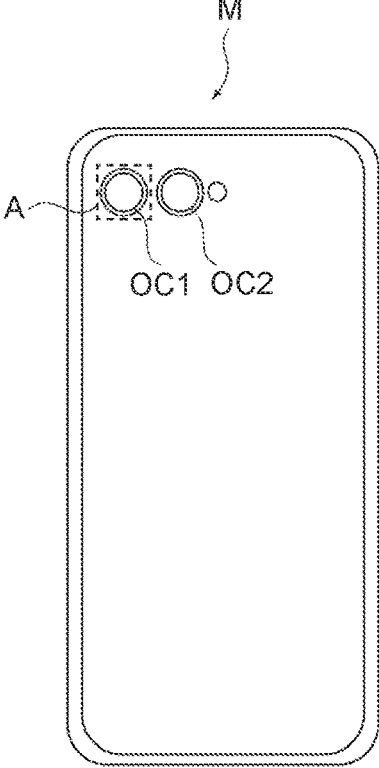
FIG. 1B is a rear view of the smartphone illustrated in FIG. 1A.

An embodiment of the present invention is elaborated below with reference to the accompanying drawings.
Smartphone
FIGS. 1A and 1B are diagrams illustrating smartphone M equipped with camera module A according to the embodiment (an example of the camera-mounted device). FIG. 1A is a front view of smartphone M, and FIG. 1B is a rear view of smartphone M.

Smartphone M includes a dual camera composed of two back surface cameras OC1 and OC2. In the embodiment, camera module A is applied to back surface cameras OC1 and OC2.

Camera module A, with an AF function, can automatically perform focusing when capturing a subject. Note that camera module A may have a shake correction function (hereinafter referred to as "OIS function"; OIS: Optical Image Stabilization). With the OIS function, images with no image blurring can be captured by optically correcting the runout (vibration) upon capturing an image.

Camera Module

Figure 2:
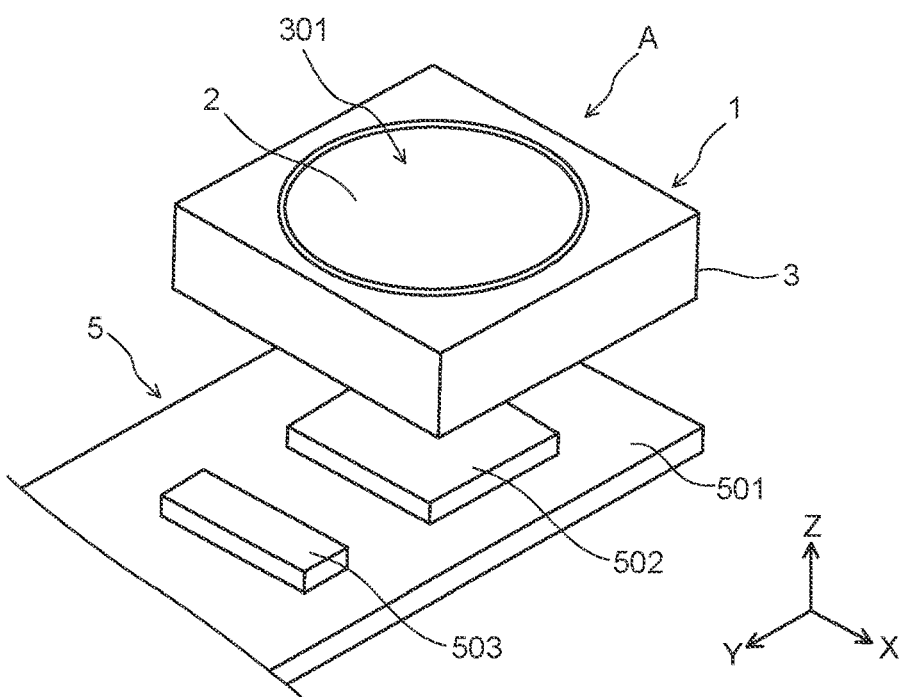
FIG. 2 is a perspective view illustrating a camera module and an image capturing part.
Figure 3:
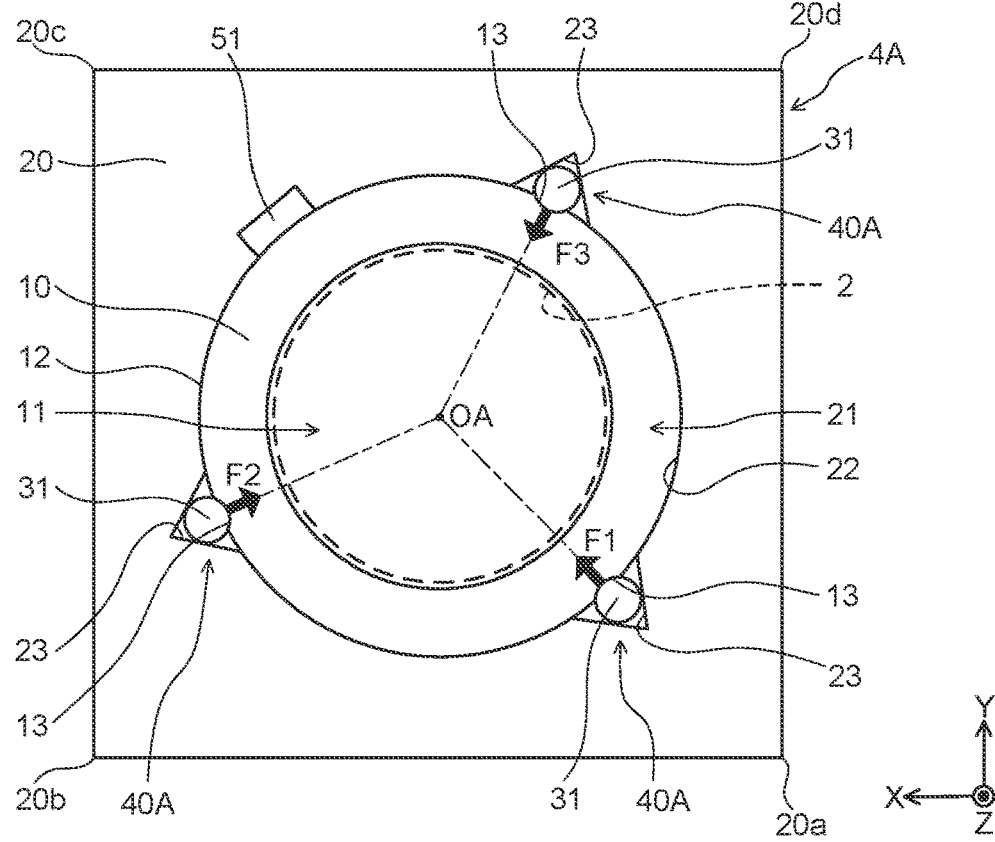
FIG. 3 is a plan view of an optical element driving device body provided in an optical element driving device of the camera module.

FIG. 2 is a perspective view illustrating camera module A and image capturing part 5. FIG. 3 is a plan view of optical element driving device body 4A provided in optical element driving device 1 of camera module A illustrated in FIG. 2. As illustrated in FIGS. 2 and 3, the embodiment is described using orthogonal coordinate systems (X, Y, Z).

For example, in the case where images are captured with smartphone M, camera module A is mounted such that the X direction is the up-down direction (or left-right direction), the Y direction is the left-right direction (or up-down direction), and the Z direction is the front-rear direction. That is, the Z direction is the optical axis direction, and in FIG. 2, the upper side (+Z side) in the drawing is the optical axis direction light reception side, and the lower side (−Z side) is the optical axis direction imaging side. In addition, in the following description, the X direction and the Y direction orthogonal to the Z axis are referred to as "optical axis orthogonal direction", and the XY plane is referred to as "optical axis orthogonal plane". In addition, the direction orthogonal to the optical axis is referred to as "radial direction".

As illustrated in FIGS. 2 and 3, camera module A includes optical element driving device 1 that achieves the AF function, lens part 2 composed with a lens housed in a cylindrical lens barrel, image capturing part 5 that captures subject images formed by lens part 2, and the like. That is, optical element driving device 1 is a so-called lens driving device that drives lens part 2 serving as an optical element.

Cover

In optical element driving device 1, the outside of optical element driving device body 4A is covered with cover 3. Cover 3 is a rectangular capped square cylinder member in plan view as viewed from the optical axis direction. In the embodiment, cover 3 has a square shape in plan view. Cover 3 includes substantially semicircular opening 301 at the top surface. Lens part 2 is housed in opening 11 of holding part 10 of optical element driving device body 4A, and exposed to the outside from opening 301 of cover 3. For example, lens part 2 is configured to protrude to the optical axis direction light reception side than the opening surface of the cover 3 along with the movement in the optical axis direction. The inner wall of cover 3 is fixed by bonding to the side surface of housing part 20 of optical element driving device body 4A, so as to house optical element driving device body 4A, for example.

Cover 3 includes a member that shields electromagnetic waves from the outside of optical element driving device 1, such as a shielding member composed of a magnetic substance.

Image Capturing Part

Image capturing part 5 is disposed on the optical axis direction imaging side of optical element driving device 1.

Image capturing part 5 includes, for example, image sensor substrate 501, and imaging element 502 and control part 503 mounted on image sensor substrate 501. Imaging element 502 is composed of a CCD (charge-coupled device) image sensor, a CMOS (complementary metal oxide semiconductor) image sensor or the like, and captures subject images formed by lens part 2, for example.

Control part 503 is composed of a control IC, and drives and controls optical element driving device 1, for example. Optical element driving device 1 is mounted on and mechanically and electrically connected to image sensor substrate 501. Note that control part 503 may be provided on image sensor substrate 501, or may be provided in a camera-mounted device (in the embodiment, smartphone M) where camera module A is mounted.

Optical Element Driving Device Body

Optical element driving device body 4A is an optical element driving device that drives lens part 2 serving as an optical element. As illustrated in FIG. 3, optical element driving device body 4A includes holding part 10 with opening 11 surrounding the outer periphery of lens part 2 that can hold lens part 2, and housing part 20 that houses holding part 10 in housing opening 21 located on the inside.

Holding part 10 includes cylindrical opening 11 at a center portion correspondingly to cylindrical lens part 2. The inner peripheral surface of opening 11 is configured to be able to hold lens part 2 inside opening 11 with an attaching groove or the like formed therein. Outer peripheral surface 12 serving as the outer side of holding part 10 is formed in a cylindrical shape. Outer peripheral surface 12 includes first groove part 13 extending along the optical axis direction of optical axis OA at a plurality of positions (e.g., three locations in FIG. 3).

Housing part 20 includes cylindrical housing opening 21 at a center portion correspondingly to cylindrical shape holding part 10. Inner peripheral surface 22 serving as the inner side of housing opening 21 includes second groove part 23 facing first groove part 13 and extending along the optical axis direction. The external shape of housing part 20 is formed in a rectangular shape in plan view.

Ball member 31 is press-fitted between first groove part 13 and second groove part 23 facing each other. To stably suppress the inclination (tilt) of lens part 2, it is desirable to dispose a plurality of ball members 31 between first groove part 13 and second groove part 23 facing each other, and in this case, the plurality of ball members 31 is disposed side by side along the optical axis direction.

First groove part 13, second groove part 23 and ball member 31 make up supporting part 40A, and a plurality of supporting parts 40A is provided correspondingly to ball members 31. Further, with supporting part 40A, holding part 10 is supported in a movable manner in the optical axis direction with respect to housing part 20. Inside housing part 20, i.e., at inner peripheral surface 22 of housing opening 21, supporting parts 40A are disposed at respective positions separately provided at least at three locations (e.g., three locations in FIG. 3) in the circumferential direction.

In the case where supporting parts 40A are separately disposed at three locations, it is desirable to dispose supporting parts 40A at an angular spacing of 120 degrees, while this angle may be changed as necessary.

In addition, supporting parts 40A may be separately disposed at three or more locations, e.g., four or five locations at inner peripheral surface 22, but desirably they are disposed basically by the three-point support that can stably support the object, or by the multiples of three, such as six and nine, points further supporting between the three-point support.

At supporting part 40A, ball member 31 is configured to perform pressing toward first groove part 13 of holding part 10 with second groove part 23 of housing part 20. Specifically, ball member 31 is configured to perform pressing in the direction toward the inside of opening 11 by making contact with first groove part 13 of holding part 10. Ball member 31 corresponds to the contact part of the present invention.

More specifically, as illustrated in FIG. 3, ball member 31 is configured to apply to first groove part 13 pressing forces F1 to F3 toward the inside of opening 11. Here, it is desirable that pressing forces F1 to F3 be directions (see the dashed line in FIG. 3) toward one point inside opening 11 as viewed in the optical axis direction, e.g., toward the center (the position of optical axis OA) of opening 11 in the case where opening 11 is a true circle in plan view.

In addition, driving part 51 that drives holding part 10 in the optical axis direction is attached to inner peripheral surface 22 of housing opening 21. With supporting part 40A and driving part 51, optical element driving device body 4A can drive lens part 2 in the optical axis direction together with holding part 10, thus achieving the AF function.

Driving part 51 is disposed at a location different from the location of supporting part 40A at inner peripheral surface 22 of housing opening 21. Here, as an example, one driving part 51 is disposed at a location facing one of three supporting parts 40A with optical axis OA therebetween.

Driving parts 51 may be disposed at a plurality of positions, and in this case, they are separately disposed in the circumferential direction at inner peripheral surface 22, as with supporting part 40A.

For example, in the case where driving parts 51 are disposed at two locations, they are disposed at locations different from the locations of supporting parts 40A so as to face each other with optical axis OA sandwiched therebetween. As an example, supporting part 40A and driving part 51 may be disposed in the same manner as optical element driving device body 4C illustrated in FIG. 11 described later.

More specifically, one supporting part 40A is disposed at a position corresponding to one (the first corner portion of the present invention) of four corner portions 20a to 20d of housing part 20, and other supporting parts 40A are disposed at portions avoiding four corner portions 20a to 20d. Then, a pair of driving parts 51 is disposed to face each other at positions corresponding to corner portions 20b and 20d (the second and third corner portions of the present invention) on both sides of corner portion 20a.

In addition, for driving part 51, a driving source such as a voice coil motor (VCM) and an ultrasound motor may be used, for example.

As described above, in the embodiment, supporting parts 40A are separately disposed at least at three locations at inner peripheral surface 22, and thus housing part 20 can stably support holding part 10 through supporting part 40A. Additionally, ball member 31 of supporting part 40A is configured to perform pressing in the direction toward the inside of opening 11 by making contact with first groove part 13. In this manner, holding part 10 is supported in a movable manner in the optical axis direction while pressing holding part 10 in the direction toward the inside of opening 11, and thus the inclination (tilt) of lens part 2 can be suppressed. As a result, housing part 20 can stably support holding part 10 through supporting part 40A, and lens part 2 can be stably movably supported even when the size and/or weight of lens part 2 is increased.

Note that in the embodiment, supporting part 40A is configured to use ball member 31, but a roller member may be used instead of ball member 31. In this case, the shape and the like of first groove part 13 and second groove part 23 may be changed in accordance with the shape, location and/or the like of the roller member. In addition, instead of ball member 31, it is possible to provide a shaft member extending in the optical axis direction, a protruding part protruding outward from outer peripheral surface 12 of holding part 10, or a protruding part protruding inward from inner peripheral surface 22 of housing opening 21 of housing part 20. In this case, it suffices to change the shape and the like of first groove part 13 and/or second groove part 23 such that the shaft member and/or the protruding part is supported in a slidable manner in the optical axis direction.

Modification 1

Figure 4:
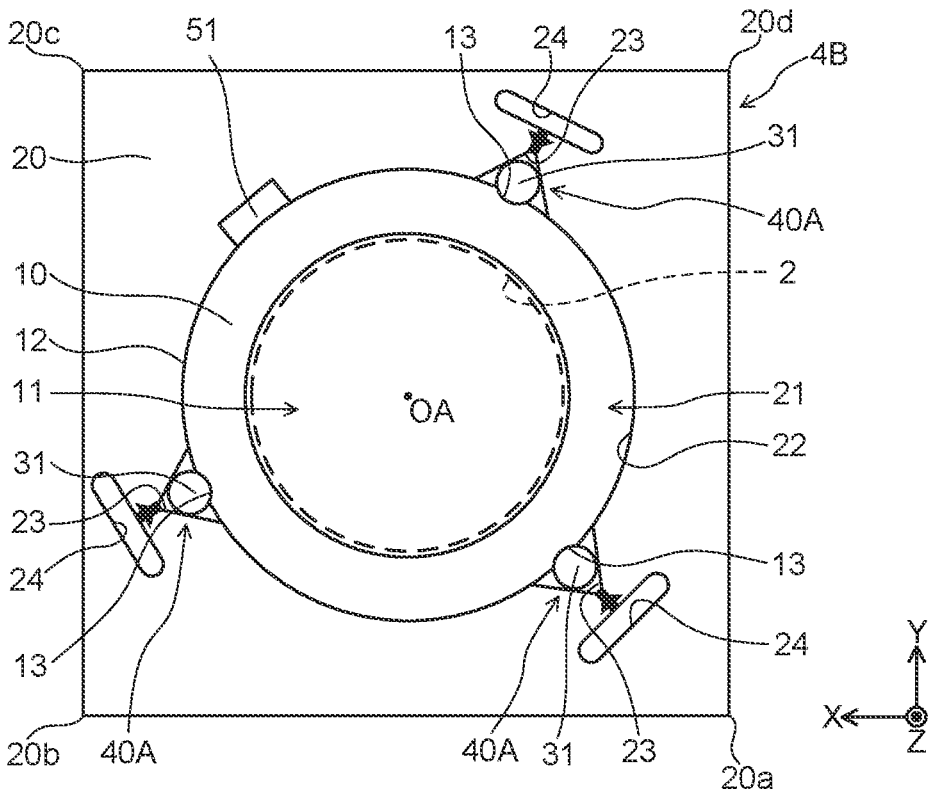
FIG. 4 is a plan view illustrating a modification (Modification 1) of the optical element driving device body illustrated in FIG. 3.

FIG. 4 is a plan view illustrating optical element driving device body 4B as a modification of optical element driving device body 4A illustrated in FIG. 3.

Optical element driving device body 4B of the present modification illustrated in FIG. 4 has the same components as those of optical element driving device body 4A illustrated in FIG. 3 except for cavity part 24 described later, and therefore the same components are denoted with the same reference numerals, and reiterated descriptions will be omitted.

In optical element driving device body 4B, housing part 20 is composed of a resin material that can be elastically deformed by adjusting the thickness and the like.

Further, in optical element driving device body 4B, cavity part 24 is formed on the outer periphery side of second groove part 23 to apply an appropriate biasing force to second groove part 23 of supporting part 40A. By changing the distance, shape and the like between second groove part 23 and cavity part 24 in plan view, it is possible to adjust the biasing force applied to second groove part 23 when the portion between second groove part 23 and cavity part 24 is elastically deformed.

In this case, the portion between second groove part 23 and cavity part 24 corresponds to the elastic member of the present invention. The contact with ball member 31 press-fitted between first groove part 13 and second groove part 23 causes elastic deformation of the portion between second groove part 23 and cavity part 24. The portion between second groove part 23 and cavity part 24 applies the restoration force resulting from its elastic deformation to second groove part 23 and ball member 31 as a biasing force. In this manner, appropriate pressing forces F1 to F3 can be applied to first groove part 13 of holding part 10 through ball member 31 by applying an appropriate biasing force to second groove part 23.

Note that in FIG. 4, cavity part 24 is disposed for each of supporting parts 40A, but cavity part 24 needs only to be disposed for at least one supporting part 40A. In this case, by adjusting the biasing force applied to second groove part 23 at one supporting part 40A, the biasing force applied to second groove part 23 can be adjusted also at other supporting parts 40A through the action and reaction of the force via holding part 10.

In addition, cavity part 24 may be formed of a through hole extending through housing part 20 in the optical axis direction, or may be formed of a bottomed recess recessed in the optical axis direction in housing part 20.

As described above, in the present modification, since cavity part 24 for applying an appropriate biasing force to supporting part 40A (second groove part 23) is formed, appropriate pressing forces F1 to F3 can be applied to holding part 10 (first groove part 13). In this manner, holding part 10 is supported in a movable manner in the optical axis direction while pressing and biasing holding part 10 in the direction toward the inside of opening 11, thus suppressing the inclination (tilt) of lens part 2. As a result, housing part 20 can stably support holding part 10 through supporting part 40A, and lens part 2 can be stably movably supported even when the size and/or weight of lens part 2 is increased.

Modification 2

Figure 5:
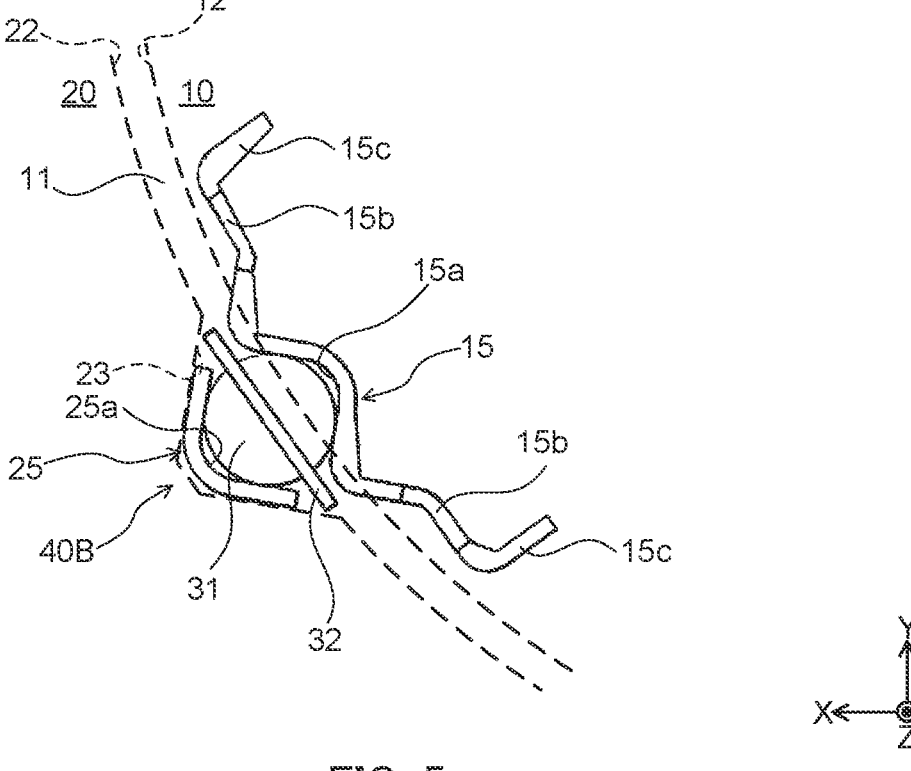
FIG. 5 is a plan view illustrating a modification (Modification 2) of a supporting part of the optical element driving device body illustrated in FIGS. 3 and 4.
Figure 6:
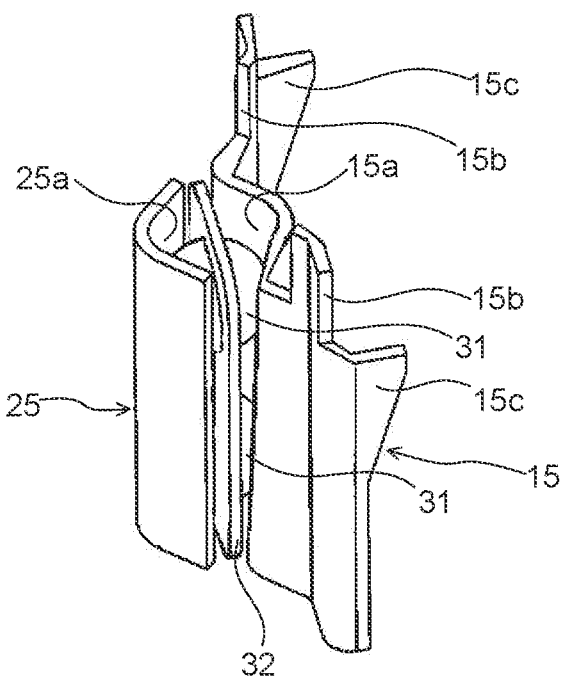
FIG. 6 is a perspective view of the supporting part illustrated in FIG. 5.
Figure 7:
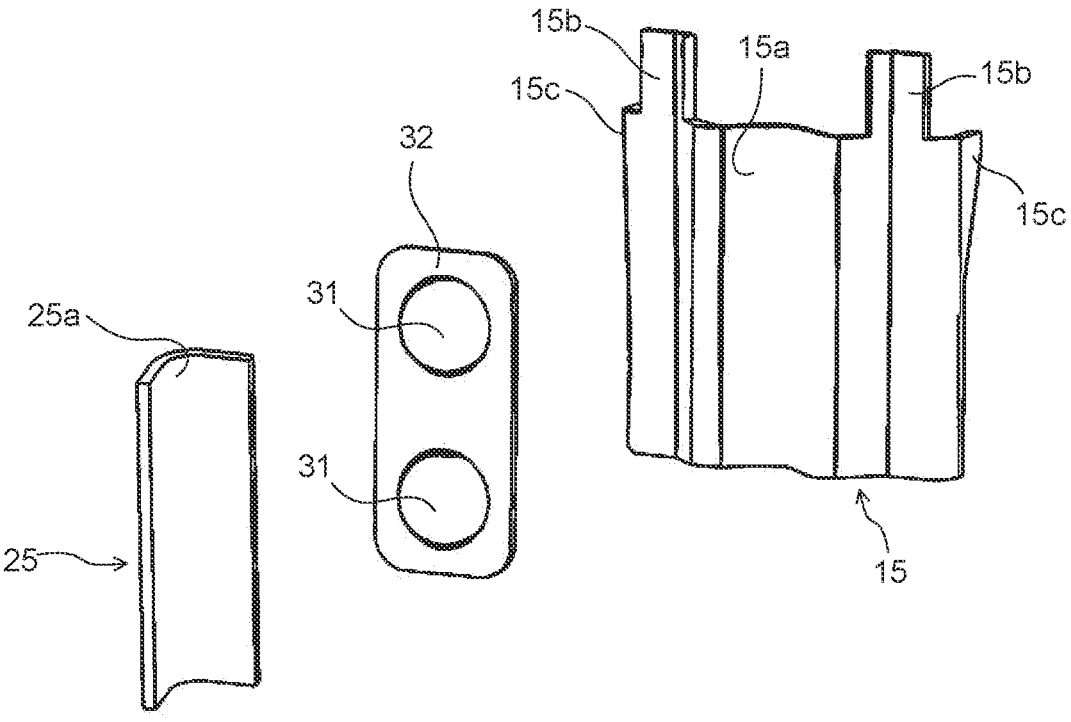
FIG. 7 is an exploded perspective view of the supporting part illustrated in FIG. 5.

FIG. 5 is a plan view illustrating supporting part 40B as a modification of optical element driving device body 4A illustrated in FIG. 3 and supporting part 40A of optical element driving device body 4B illustrated in FIG. 4. In addition, FIG. 6 is a perspective view of supporting part 40B, and FIG. 7 is an exploded perspective view of supporting part 40B. Note that in FIG. 7, the members making up supporting part 40B are illustrated from a different angle.

The present modification has a configuration using supporting part 40B described later instead of supporting part 40A of optical element driving device body 4A illustrated in FIG. 3 and optical element driving device body 4B illustrated in FIG. 4. Therefore, the same components as those of optical element driving device body 4A and optical element driving device body 4B are denoted with the same reference numerals, and reiterated descriptions will be omitted.

To further suppress the inclination (tilt) of lens part 2, it is desirable to increase pressing forces F1 to F3 applied to holding part 10 side. In general, ball member 31 is composed of a material such as ceramics and alloys, and as such first groove part 13 and second groove part 23 sandwiching ball member 31 are required to have strength to withstand pressing forces F1 to F3 in order to increase pressing forces F1 to F3.

Therefore, in the present modification, first rail member 15 (the first groove part of the present invention) is attached to outer peripheral surface 12 serving as the outer side of holding part 10, and second rail member 25 (the second groove part of the present invention) is attached to inner peripheral surface 22 serving as the inner side of housing part 20. In general, first rail member 15 and second rail member 25 are composed of a material, such as a metal material, harder than holding part 10 and housing part 20 formed of resin or the like.

First rail member 15 includes sandwiching surface 15a and claw parts 15b and 15c attached to outer peripheral surface 12. Sandwiching surface 15a rotatably sandwiches ball member 31 when it moves in the optical axis direction together with holding part 10. Sandwiching surface 15a is a curved surface extending in the optical axis direction with a center portion recessed to the inside of opening 11 in plan view. Claw part 15b is extended to the optical axis direction light reception side (+Z side) and disposed at two locations sandwiching sandwiching surface 15a. In addition, claw part 15c is extended toward the inside of opening 11 and disposed at two locations sandwiching sandwiching surface 15a and claw part 15b.

Although not illustrated in the drawings, in holding part 10, an insertion groove for insertion of claw part 15b is formed, and an insertion groove for insertion of claw part 15c is formed. With claw parts 15b and 15c inserted and fixed to these insertion grooves, first rail member 15 is attached to outer peripheral surface 12 of holding part 10.

Second rail member 25 includes sandwiching surface 25a that rotatably sandwiches ball member 31. Sandwiching surface 25a is a curved surface extending in the optical axis direction, with a center portion curved and recessed outward with respect to outer peripheral surface 12 in plan view.

Second rail member 25 is disposed in the above-described second groove part 23, and fixed inside second groove part 23 by means of adhesive or the like, for example.

First rail member 15 and second rail member 25 are disposed to face each other with ball member 31 sandwiched therebetween. Two ball members 31 are sandwiched between first rail member 15 and second rail member 25, for example. Two ball members 31 are held by retainer 32 such that the mutual distance can be kept constant and that they can be positioned in the optical axis direction.

Note that it is possible to adjust the surface roughness of sandwiching surface 15a of first rail member 15 and sandwiching surface 25a of second rail member 25 to be smoother so as to further smoothen the rotation of ball member 31 sandwiched therebetween. In this manner, first rail member 15 can move more smoothly in the optical axis direction, i.e., holding part 10 can move more smoothly in the optical axis direction.

As described above, in the present modification, first rail member 15 and second rail member 25 composed of a material harder than holding part 10 and housing part 20 are provided, and ball member 31 is sandwiched by first rail member 15 and second rail member 25. Since ball member 31 is sandwiched by first rail member 15 and second rail member 25 in this manner, deformation of holding part 10 and housing part 20 due to ball member 31 can be suppressed in comparison with the configurations of the embodiment and Modification 1. In addition, since first rail member 15 and second rail member 25 are less deformed even when pressing forces F1 to F3 are increased, strong pressing forces F1 to F3 can be applied to holding part 10 side, and the inclination (tilt) of lens part 2 can be more reliably suppressed.

As a result, housing part 20 can stably support holding part 10 through supporting part 40B, and lens part 2 can be stably movably supported even when the size and/or weight of lens part 2 is increased.

Modification 3

Figure 8:
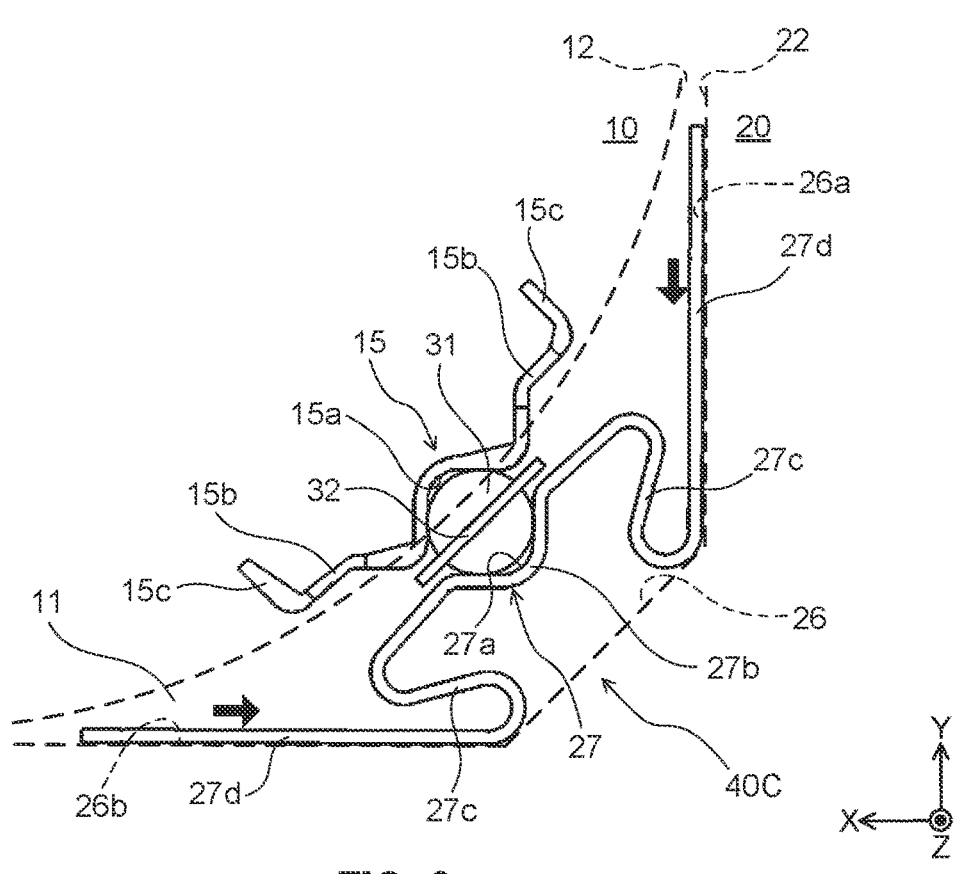
FIG. 8 is a plan view illustrating a modification (Modification 3) of the supporting part of the optical element driving device body illustrated in FIGS. 3 and 4.
Figure 9:
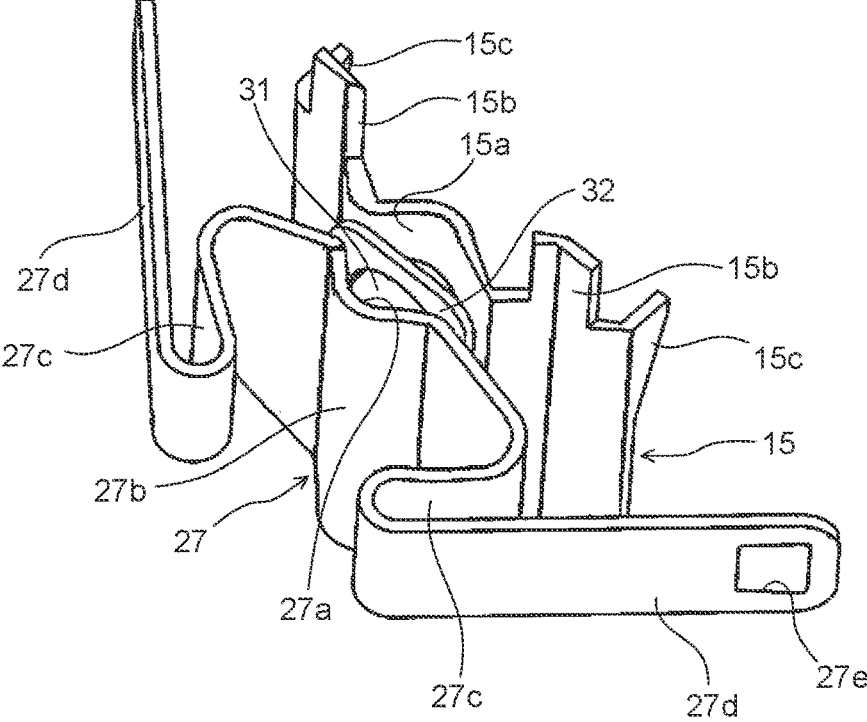
FIG. 9 is a perspective view of the supporting part illustrated in FIG. 8.
Figure 10:
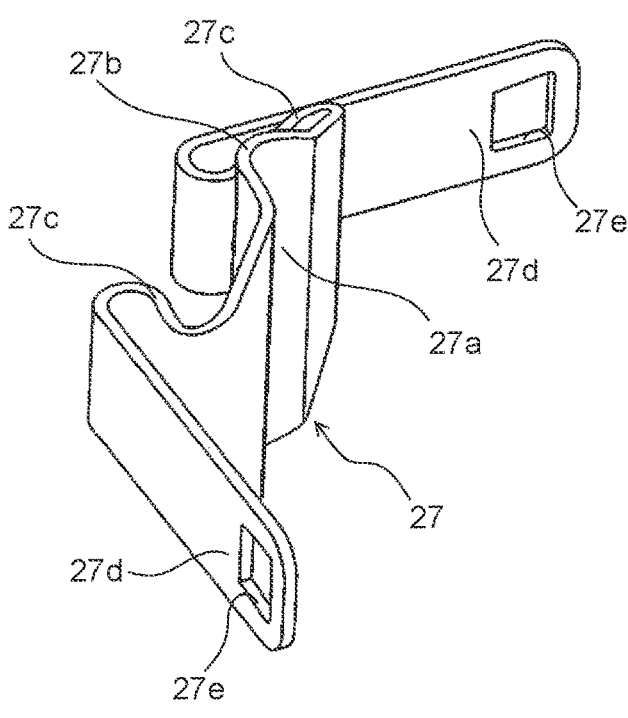
FIG. 10 is a perspective view of a second rail member of the supporting part illustrated in FIG. 9.

FIG. 8 is a plan view illustrating supporting part 40C as a modification of optical element driving device body 4A illustrated in FIG. 3 and supporting part 40A of optical element driving device body 4B illustrated in FIG. 4. In addition, FIG. 9 is a perspective view of supporting part 40C, and FIG. 10 is a perspective view of a second rail member of supporting part 40C.

The present modification also has a configuration using supporting part 40C described later instead of supporting part 40A of optical element driving device body 4A illustrated in FIG. 3 and optical element driving device body 4B illustrated in FIG. 4 and supporting part 40B illustrated in FIG. 5. Therefore, the same components as those of optical element driving device body 4A, optical element driving device body 4B and supporting part 40B are denoted with the same reference numerals, and reiterated descriptions will be omitted.

The present modification adopts a configuration using elastically deformable second rail member 27 (the elastic member of the present invention) instead of second rail member 25 of supporting part 40B illustrated in FIG. 5. Second rail member 27 is also attached to inner peripheral surface 22 of housing part 20, and is formed of a material such as a metal material harder than holding part 10 and housing part 20. First rail member 15, ball member 31 and retainer 32 are the same as those described in Modification 2.

Second rail member 27 includes fixing part 27*d* (the first fixing part and second fixing part of the present invention) fixed to inner wall surface 26 formed at inner peripheral surface 22 of housing part 20, and application part 27*b* that makes contact with ball member 31 to apply a biasing force.

The inside (first rail member 15 side) of application part 27*b* is sandwiching surface 27*a* that rotatably sandwiches ball member 31. Sandwiching surface 27*a* is a curved surface extending in the optical axis direction, with a center portion curved and recessed outward with respect to outer peripheral surface 12 in plan view.

Application part 27*b* is connected to deformation parts 27*c* disposed at two locations sandwiching application part 27*b*. In plan view, deformation parts 27*c* are formed in a meandering shape, and are disposed at two locations in a line-symmetric manner with application part 27*b* sandwiched therebetween. Deformation part 27*c* formed in the above-mentioned manner is elastically-deformable, and transmits the restoration force resulting from the elastic deformation to application part 27*b* as a biasing force. In addition, deformation part 27*c* is configured to pull two fixing parts 27*d* in the direction approaching each other (see the black arrow in FIG. 8).

Fixing parts 27*d* are disposed at two locations sandwiching application part 27*b* and deformation part 27*c*, and are connected to deformation part 27*c*. Fixing parts 27*d* disposed at two locations are extended along the opposite directions in the circumferential direction surrounding holding part 10, and are fixed to inner wall surface 26. Fixing part 27*d* is provided with fixing hole 27*e*, and fixed to inner wall surface 26 with fixing hole 27*e* locked to the lock part (omitted in the drawing) formed at inner wall surface 26.

When fixing fixing part 27*d* to inner wall surface 26, fixing part 27*d* is fixed to inner wall surface 26 by locking fixing hole 27*e* to the lock part of inner wall surface 26 with two fixing parts 27*d* pulled (extended) outward such that a force of moving two fixing parts 27*d* in the direction approaching each other acts. In this manner, two fixing parts 27*d* pull two fixing surfaces 26*a* and 26*b* of inner wall surface 26 in the direction approaching each other, and thus other supporting part 40C can be biased through housing part 20 (in the entirety of housing part 20). In this manner, for example, even in a configuration with one supporting part 40C and the other supporting parts serving as the above-mentioned supporting parts 40B, supporting part 40B can be biased with second rail member 27 of supporting part 40C through housing part 20 (in the entirety of housing part 20).

Inner wall surface 26 is formed at inner peripheral surface 22 correspondingly to the shape of second rail member 27. Here, as an example, two fixing surfaces 26*a* and 26*b* of inner wall surface 26 where two fixing parts 27*d* are fixed are orthogonal to each other.

In the case where three supporting parts, e.g., a combination of two supporting parts 40B and one supporting part 40C, are provided, it suffices to provide one supporting part 40C requiring a space, thus achieving space-saving and size reduction of the entirety of the device. In addition, it suffices to provide one second rail member 27 with a complex shape, cost down can be achieved in comparison with a case using a plurality of second rail members.

Figure 11:
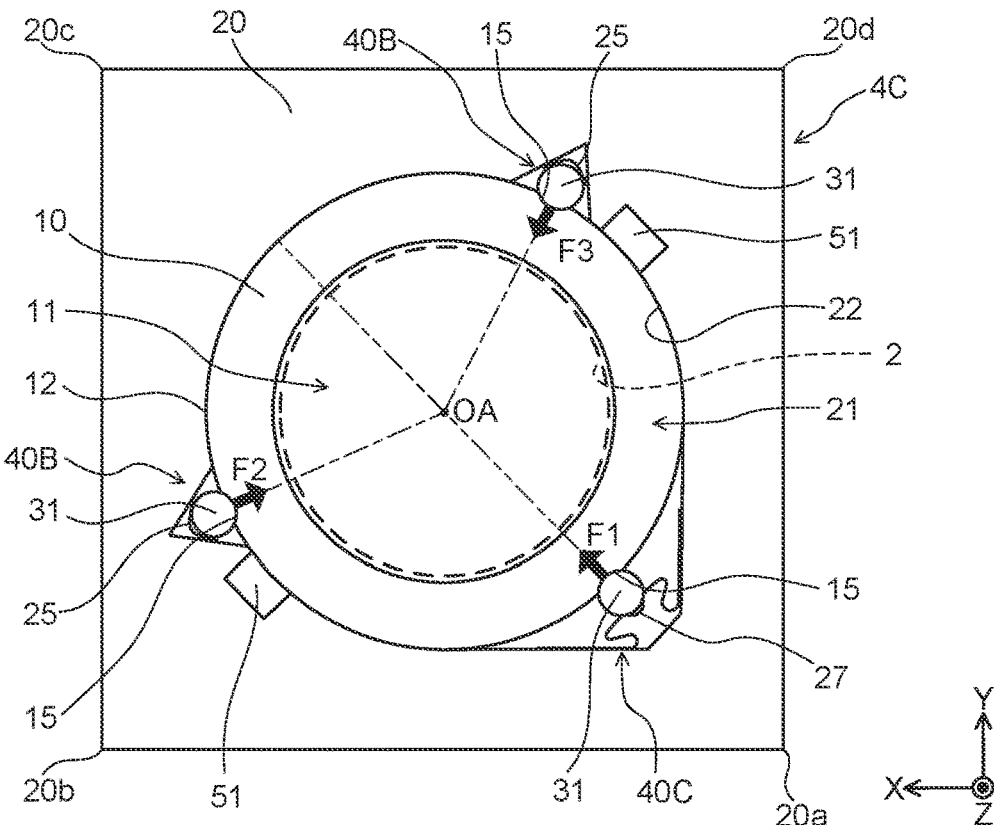
FIG. 11 is a plan view of an optical element driving device body with two driving parts.

Now, FIG. 11 illustrates an exemplary case including a combination of two supporting parts 40B and one supporting part 40C, and including two driving parts 51. FIG. 11 is a plan view of optical element driving device body 4C with two driving parts 51. For optical element driving device body 4C, the same components as those of the components of the above-described optical element driving device bodies 4A and 4B and Modification 2 are denoted with the same reference numerals, and reiterated descriptions will be omitted.

As described above, optical element driving device body 4C includes two supporting parts 40B, one supporting part 40C, and two driving parts 51. In the case where the above-mentioned configuration is adopted, it suffices to dispose supporting part 40B, supporting part 40C and driving part 51 as illustrated in FIG. 11, for example.

More specifically, one supporting part 40C provided with second rail member 27 is disposed at one corner portion 20*a* (the first corner portion of the present invention) of four corner portions 20*a* to 20*d* of housing part 20. In addition, other two supporting parts 40B are disposed at portions avoiding four corner portions 20*a* to 20*d*. Further, a pair of driving parts 51 is disposed to face each other with optical axis OA sandwiched therebetween at portions corresponding to corner portions 20*b* and 20*d* (the second and third corner portions of the present invention) on both sides of corner portion 20*a*.

As illustrated in FIG. 11, in the case of a combination of two supporting parts 40B and one supporting part 40C, one supporting part 40C is a part for applying the biasing force, and two supporting parts 40B are parts for receiving the biasing force. In such a configuration, the position of supporting part 40B at inner peripheral surface 22 of housing opening 21 is set as follows.

Specifically, in supporting part 40C, the direction of pressing force F1 of ball member 31 resulting from the biasing force of second rail member 27, e.g., an extension extending the direction of pressing force F1 (the chain double-dashed line in the drawing) is assumed. Two supporting parts 40B are disposed by setting their positions such that they are line-symmetric with respect to the assumed extension. With two supporting parts 40B disposed at such positions, the biasing force received by two supporting parts 40B from one supporting part 40C is equalized, and holding part 10 can be stably supported.

Ideally, the spacing between two supporting parts 40B and one supporting part 40C is a spacing of 120 degrees, but may not be a spacing of 120 degrees. In this case, it suffices to dispose supporting parts 40B by setting their positions such that they are line-symmetric with respect to the direction (extension) of pressing force F1 as described above. In addition, the pair of driving parts 51 is disposed to face each other at portions corresponding to corner portions 20*b* and 20*d* such that they are line-symmetric with respect to the direction (extension) of pressing force F1.

As described above, also in the present modification, first rail member 15 and second rail member 27 composed of a material harder than holding part 10 and housing part 20 is provided, and ball member 31 is sandwiched by first rail member 15 and second rail member 27. In this manner, as described in Modification 2, deformation of holding part 10 and housing part 20 due to ball member 31 can be suppressed, strong pressing forces F1 to F3 can be applied to holding part 10 side, and, the inclination (tilt) of lens part 2 can be more reliably suppressed.

In addition, since supporting part 40C includes second rail member 27 for serving as an elastic member for applying an appropriate biasing force, appropriate pressing forces F1 to F3 can be applied to holding part 10 through ball member 31. In this manner, the inclination (tilt) of lens part 2 can be suppressed.

As a result, housing part 20 can stably support holding part 10 through supporting part 40C, and lens part 2 can be stably movably supported even when the size and/or weight of lens part 2 is increased.

OTHER EMBODIMENTS

The present invention is not limited to the above-described embodiments and modifications, but may be modified within the gist.

For example, in the above-mentioned embodiments and modifications, smartphone M is described as an example, but the present invention is applicable to a camera-mounted device including a camera module and an image processing part for processing image information obtained by the camera module. The camera-mounted device includes an information device and a transport device. The information device includes a camera-equipped mobile phone, a note-type personal computer, a tablet terminal, a mobile game machine, a webcamera, and a camera-equipped in-vehicle device (for example, a rear-view monitor device and a drive recorder device), for example. In addition, the transport device includes an automobile, for example.

Figure 12A:
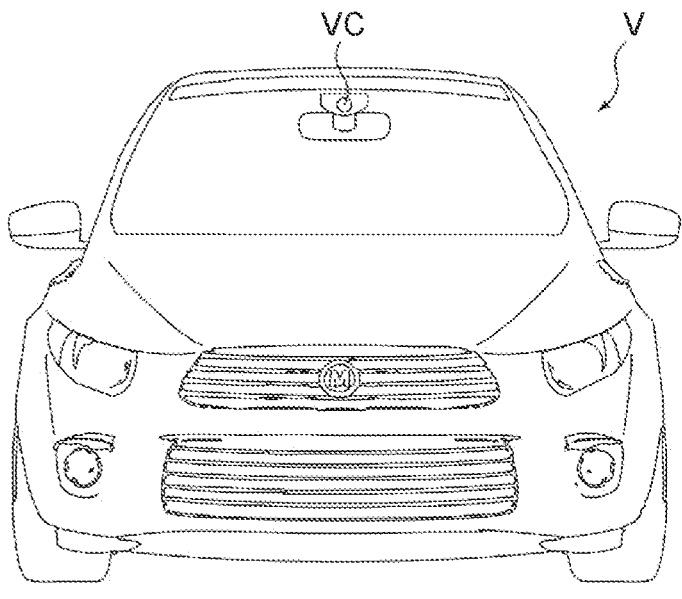
FIG. 12A is a front view illustrating an automobile serving as a camera-mounted device equipped with an in-vehicle camera module.
Figure 12B:
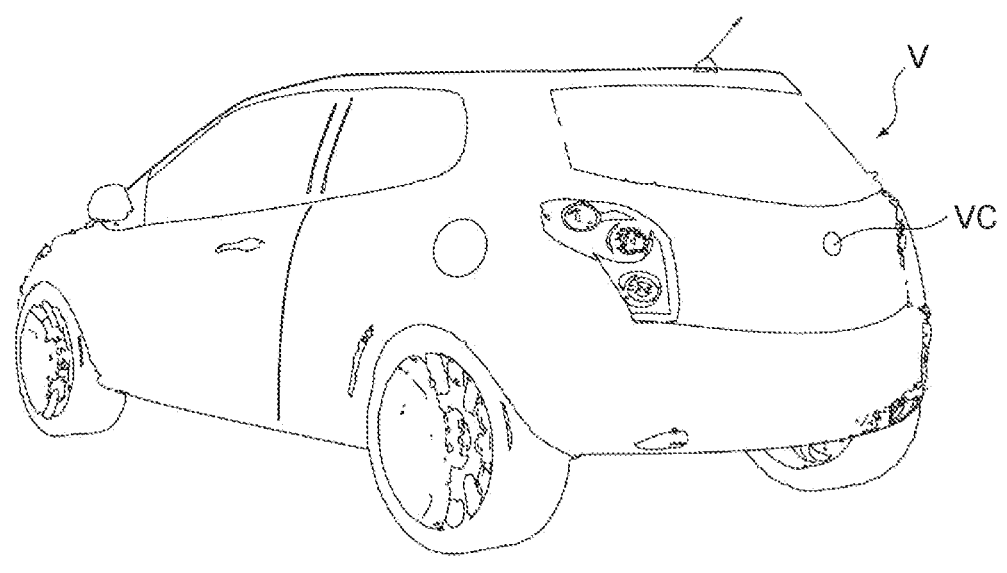
FIG. 12B is a perspective view of the automobile illustrated in FIG. 12A as viewed from an oblique rearward side.

FIGS. 12A and 12B are diagrams illustrating automobile V serving as a camera-mounted device equipped with an in-vehicle camera module VC (Vehicle Camera). FIG. 12A is a front view of automobile V, and FIG. 12B is a rear perspective view of automobile V. Automobile V is equipped with camera module A described in the above-mentioned embodiments and modifications as an in-vehicle camera module VC. As illustrated in FIGS. 12A and 12B, in-vehicle camera module VC is attached to the windshield to face forward, and attached to the rear gate to face rearward, for example. The in-vehicle camera module VC is used for rear-view monitors, drive recorders, collision-avoidance control, automated driving control and the like.

In addition, in the above-mentioned embodiments and modifications, optical element driving device 1 drives lens part 2 as an optical element, but the optical element to be driven may be optical elements such as mirrors and prisms other than lenses.

In addition, in the above-mentioned embodiments and modifications, lens part 2 and holding part 10 are formed in a cylindrical shape, but the shapes of lens part 2 and holding part 10 may be changed as necessary as long as holding part 10 can be driven in the Z direction together with lens part 2. Further, the shapes of opening 11 and housing opening 21 may be changed in accordance with the shapes of lens part 2 and holding part 10. In addition, the external shape of housing part 20 is formed in a rectangular shape in plan view, but the external shape of housing part 20 may be changed as necessary.

In addition, in the above-mentioned embodiments and modifications, optical element driving device 1 has the AF function, but it may also have a function of moving lens part 2 in the optical axis direction such as a zoom function as well as the AF function.

The above is a description of the embodiments and variations of the present invention. The above description is an example of a suitable embodiment of the invention, and the scope of the invention is not limited to this. In other words, the above description of the configuration of the device and the shape of each part is an example, and it is clear that various changes and additions to these examples are possible within the scope of the invention.

This application is entitled to and claims the benefit of Japanese Patent Application No. 2021-138402 filed on Aug. 26, 2021, the disclosure each of which including the specification, drawings and abstract is incorporated herein by reference in its entirety.

INDUSTRIAL APPLICABILITY

The optical element driving device and the camera module according to the present invention are useful when mounted in camera-mounted devices such as smartphones, mobile phones, digital cameras, note-type personal computers, tablet terminals, mobile game machines, and in-vehicle cameras, for example.

REFERENCE SIGNS LIST

1 Optical element driving device
2 Lens part
3 Cover
4A, 4B, 4C Optical element driving device body
5 Image capturing part
10 Holding part
11 Opening
12 Outer peripheral surface
13 First groove part
15 First rail member
15a Sandwiching surface
15b, 15c Claw part
20 Housing part
20a, 20b, 20c, 20d Corner portion
21 Housing opening
22 Inner peripheral surface
23 Second groove part
24 Cavity part
25 Second rail member
25a Sandwiching surface
26 Inner wall surface
26a, 26b Fixing surface
27 Second rail member
27a Sandwiching surface
27b Application part
27c Deformation part
27d Fixing part
27c Fixing hole
31 Ball member
32 Retainer
40A, 40B. 40C Supporting part
51 Driving part
301 Opening
501 Image sensor substrate
502 Imaging element
503 Control part

The invention claimed is:
1. An optical element driving device configured to drive an optical element, the optical element driving device comprising:
   a holding part including an opening surrounding an outer periphery of the optical element and configured to hold the optical element;
   a housing part configured to house the holding part inside; and
   a supporting part including a plurality of contact parts configured to make contact with the holding part at positions separately provided at least at three locations in a circumferential direction inside the housing part, the supporting part being configured to support the holding part in a movable manner in an optical axis direction of the optical element while pressing the holding part in a direction toward inside of the opening with the plurality of contact parts, wherein a plurality of the supporting parts is provided correspondingly to the plurality of contact parts, each supporting part including a first groove part located outside the holding part and extended in the optical axis direction, and a second groove part located inside the housing part and extended in the optical axis direction, the first groove part and the second groove part face each other with the contact part sandwiched between the first groove part and the second groove part, the first groove part includes a first rail member attached to outside of the holding part, the second groove part includes a second rail member attached to inside of the housing part, and the first rail member and the second rail member are formed of a material harder than that of the holding part and the housing part.

2. The optical element driving device according to claim 1, wherein the supporting part performs pressing in a direction toward one point located inside the opening with the plurality of contact parts.

3. The optical element driving device according to claim 1, wherein a plurality of the supporting parts is provided correspondingly to the plurality of contact parts, and at least one of the plurality of supporting parts includes an elastic member configured to apply to the contact part a biasing force in the direction toward inside of the opening.

4. The optical element driving device according to claim 3, wherein the elastic member includes:

an application part configured to make contact with the contact part to apply the biasing force to the contact part;

a deformation part connected to the application part and provided in an elastically-deformable manner, the deformation part being configured to transmit to the application part a restoration force resulting from elastic deformation as the biasing force; and a fixing part connected to the deformation part, and fixed to the housing part in a state where the deformation part is elastically deformed.

5. The optical element driving device according to claim 3, wherein the housing part has a rectangular shape in plan view, one of the plurality of supporting parts including the elastic member is disposed at a portion corresponding to a first corner portion of four corner portions of the housing part, and other supporting parts are disposed at portions avoiding the four corner portions, and a pair of driving parts configured to drive the holding part in a movable manner in the optical axis direction is disposed to face each other at portions corresponding to second and third corner portions located on both sides of the first corner portion.

6. The optical element driving device according to claim 3, wherein the elastic member includes a cavity part provided on an outer periphery side of at least one of the plurality of supporting parts in the housing part, and a portion between the supporting part and the cavity part serves as the elastic member to apply to the contact part a restoration force resulting from elastic deformation due to contact with the contact part as the biasing force.

7. A camera module comprising:

the optical element driving device according to claim 1;

a driving part configured to drive the holding part in a movable manner in the optical axis direction; and an image capturing part configured to capture a subject image formed by the optical element.

8. A camera-mounted device that is an information device or a transport device, the camera-mounted device comprising:

the camera module according to claim 7; and an image processing part configured to process image information obtained by the camera module.

9. An optical element driving device configured to drive an optical element, the optical element driving device comprising:

a holding part including an opening surrounding an outer periphery of the optical element and configured to hold the optical element;

a housing part configured to house the holding part inside; and a supporting part including a plurality of contact parts configured to make contact with the holding part at positions separately provided at least at three locations in a circumferential direction inside the housing part, the supporting part being configured to support the holding part in a movable manner in an optical axis direction of the optical element while pressing the holding part in a direction toward inside of the opening with the plurality of contact parts, wherein a plurality of the supporting parts is provided correspondingly to the plurality of contact parts, at least one of the plurality of supporting parts includes an elastic member configured to apply to the contact part a biasing force in the direction toward inside of the opening, the elastic member is extended in the optical axis direction and includes a groove part which allows the contact part, disposed inside of the groove part, to move in the optical axis direction, and the groove part is configured to make contact with the contact part to apply the biasing force to the contact part.

* * * * *